United States Patent [19] [11] 4,390,686
Janssen et al. [45] Jun. 28, 1983

[54] POLYESTER-AMIDE RESIN

[75] Inventors: Harald Janssen, Stemwarde-Siedlung; Ferdinand Hansch, Wedel, both of Fed. Rep. of Germany

[73] Assignee: Dr. Beck & Co. AG, Hamburg, Fed. Rep. of Germany

[21] Appl. No.: 367,537

[22] Filed: Apr. 12, 1982

Related U.S. Application Data

[60] Division of Ser. No. 109,944, Jan. 7, 1980, Pat. No. 4,360,543, which is a continuation of Ser. No. 539,879, Jan. 9, 1975, abandoned.

[30] Foreign Application Priority Data

Jan. 10, 1974 [DE] Fed. Rep. of Germany ....... 2401027

[51] Int. Cl.³ ........................ C08G 69/44; C08G 73/16
[52] U.S. Cl. .................................... 528/289; 528/288; 528/291; 528/292; 528/296
[58] Field of Search ............... 528/288, 289, 291, 292, 528/296

[56] References Cited

U.S. PATENT DOCUMENTS

| | | | |
|---|---|---|---|
| 3,931,418 | 1/1976 | Risken | 528/289 X |
| 4,069,209 | 1/1978 | Lange | 528/289 |
| 4,075,179 | 2/1978 | Karkoski et al. | 528/289 |
| 4,081,427 | 3/1978 | Lange | 528/289 |
| 4,113,706 | 9/1978 | Lange | 528/289 |
| 4,127,553 | 11/1978 | Osada et al. | 528/289 X |
| 4,180,612 | 12/1979 | Pauzë et al. | 528/289 |
| 4,195,159 | 3/1980 | Kwiecinski | 528/288 |
| 4,218,550 | 8/1980 | Pauzë528 | 289 X/ |

FOREIGN PATENT DOCUMENTS

| | | |
|---|---|---|
| 973377 | 10/1964 | United Kingdom . |
| 1263022 | 2/1972 | United Kingdom . |

*Primary Examiner*—Lucille M. Phynes
*Attorney, Agent, or Firm*—Sprung, Horn, Kramer & Woods

[57] ABSTRACT

A method of insulating an electrical conductor by applying thereto a coating of a polyesterimide resin which can be hardened through its free OH groups from a resin melt at above 100° C., wherein the resin used is solvent-free and has been prepared by esterification or ester-exchange of starting materials for the polyesterimide in the presence of an excess of one or more short-chain diols and subsequent removal of the diol or diols in such a way that the condensation is only effected to an extent such that the Durrans softening point of the unhardened resin is not above 150° C. (preferably not above 100° C.) and the viscosity of the molten resin at 180° C. is not above 5000 (preferably not above 1000) mPa s (cP). This process avoids the disadvantages encountered when a solvent is present in the insulating bath.

16 Claims, No Drawings

POLYESTER-AMIDE RESIN

This is a division, of application Ser. No. 109,944, filed Jan. 7, 1980, now U.S. Pat. No. 4,360,543, which in turn is a continuation of application Ser. No. 539,879 filed Jan. 9, 1975, now abandoned.

This invention relates to the insulation of electrical conductors.

It is already known to insulate electrical conductors (in particular copper or aluminium wires) by treatment with a wire lacquer. Wire lacquers are solutions of organic synthetic resins in solvents, preferably cresols and xylenols, with solids contents of from about 15 to about 45%, which are applied to the wire in a plurality of thin layers and are then burned-in.

Electrical conductors may be insulated in known manner using wire lacquer furnaces with 5 to 8 passages, each layer having to be individually burned-in at a high temperature with evaporation of the solvents present.

It is obvious that many problems arise through the use of solvents in the insulation of electrical conductors. Whereas the problem of uniform solvent vaporisation, which is absolutely necessary in order to achieve a smooth and satisfactorily hardened lacquer film, can be overcome by matching the vaporisation curves of the individual solvents of the mixture, the removal of the solvents, which usually have a high boiling point, from the reaction chamber presents substantial difficulties and is possible only with the use of a large amount of energy. Otherwise, retention of solvent in the insulated electrical conductor (e.g. a lacquered wire) must be expected, as a result of which the quality of the products is naturally deleteriously affected.

Another serious disadvantage of the use of wire lacquers with a high solvent content is the problem of the pollution of the atmosphere by the very aggressive solvents used. It is desirable and may be legally necessary that the pollution of the atmosphere by waste gases should be reduced to a minimum; this, however, necessitates the provision of expensive devices in the lacquering machines, e.g. catalyst elements.

Finally, the great danger from cresolic solvents in contact with the skin and from inhaling aromatic vapours employed as fillers must be mentioned. It is, in fact, the latter danger which generally cannot be avoided in practice.

It will be clear from the above that the introduction of a process for the insulation of electrical conductors using a solvent-free resin melt represents a clear and urgently required step forward in the art.

In order to comply with present-day requirements for a high grade lacquer wire solution, however, only particular groups of resins, preferably reactive resins which in the hardened state exhibit outstanding thermal resistance, can be used. The use of thermoplastic synthetic resins, e.g. polyethylene or polyvinyl chloride which are used on a large scale in cable insulation, can be ruled out from the start.

A class of reactive resins which is particularly suitable for the insulation of electrical conductors is the class of polyesterimides which are described in German patent specification Nos. 1,445,263 and 1,495,100, and in United Kingdom patent specification No. 973,377. Polyesterimides have previously been proposed for coating electrical conductors from the melt (see U.K. patent specification No. 1,263,022 and German patent specification No. 2,135,157). These known processes, however; involve the fundamental disadvantage that in practice more or less large additions of solvent are still required in order to achieve a melt viscosity which is sufficiently low to enable a wire to be coated with the melt. Only limited use can be made of the possibility of reducing the viscosity by increasing the temperature of the melt since there is then a danger that the reactive resin melt will gel.

Thus, the technical advantage of using a resin melt is greatly limited by the solvent addition which is required in practice.

It is an object of the present invention to provide a method of insulating electrical conductors using a polyesterimide resin melt which does not suffer from this disadvantage.

According to the invention, there is provided a method of insulating an electrical conductor which comprises applying to said conductor a coating of a polyesterimide resin which can be hardened through its free hydroxyl groups and which may also contain imide groups, from a melt of the resin at a temperature above 100° C. using a heatable application means, wherein the resin used is solvent-free, and has been prepared by the esterification or ester exchange of the starting materials for the polyesterimide in the presence of an excess of one or more short-chain diols, and subsequent removal of the diol or diols in such manner that the condensation is only effected to an extent such that the Durrans softening point of the unhardened resin is not greater than 150° C., and that the viscosity of the molten resin at 180° C. is not greater than 5000 mPa s (cP). Preferably, the Durrans softening point of the resin used does not exceed 100° C., and preferably the melt viscosity at 180° C. does not exceed 1000 mPa s (cP). In particular, the Durrans softening point may conveniently lie in the range 60°-100° C., preferably in the range 65°-90° C.

In a particularly preferred embodiment of the method of the invention, the equivalent ratio of hydroxyl-groups to ester-forming carboxyl groups in the polyesterimide reaction mixture may be in the range of 2.5:1 to 20:1, preferably in the range of 3:1 to 8:1. The excess of diol or diols is included in these numerical values. It is particularly convenient to employ a glycol excess of 1.25 to 3 mol of glycol per mol of ester group which has been formed or is to be formed in the resin.

The low-viscosity polyesterimide resin condensates to be used in accordance with the invention may be produced in known manner. The essential components required for the formation of polyesterimide resins are described, for example, in the previously mentioned German patent specifications Nos. 1,445,263 and 1,495,100 and in U.K. patent specification No. 973,377. In particular, they may be produced by condensing polybasic acids with polyhydric alcohols, one or more of the starting materials used containing one or more five-membered imide rings between the functional groups of the molecule. The imide rings are preferably ortho-fused with aromatic nuclei. The intermediate products which contain the imide rings can be produced in situ in the reaction mixture for producing the polyester. Actually, this method of proceeding is to be preferred in practice for the production of polyesterimide resins. Particularly suitable starting materials for the production of the components which contain cyclic imide groups are trimellitic acid and/or pyromellitic acid or their anhydrides or other reactive derivatives. These can, for example, be reacted with diprimary amines, preferably aromatic diamines, to form polycarboxylic acids containing imide groups. Polycarboxylic acids of this kind then react with polyhydric alcohols to form polyesterimides.

Particularly preferred polyesterimide resins are those produced from one or more dicarboxylic acids as the components containing imide groups, which acids have themselves been produced by the reaction of 2 mol of trimellitic acid or trimellitic anhydride with one mol of an aromatic diamine (diprimary diamine). Preferably, the dicarboxylic acids containing imide rings are those in which dinuclear diprimary aromatic diamines of the p, p'-diamino-diphenylmethane type or the corresponding p, p'-diamino-diphenylether type have been used as the diamine component. These dicarboxylic acids are reacted with polyhydric alcohols to form polyesters. A part of the dicarboxylic acid containing imide groups can be replaced by one or more dicarboxylic acids which are free from imide groups, in particular aromatic dicarboxylic acids of the terephthalic acid or isophthalic acid type. Preferably, in such cases at least 10 mol% of the dicarboxylic acid containing imide groups (relative to the total acid mixture) is used, although larger quantities of dicarboxylic acids containing imide groups are expediently used. At least 40 mol% (again relative to the total dicarboxylic acid mixture) can preferably be used, although in general the amount of the imide group containing dicarboxylic acid will preferably be in the range of from 40–80 mol %. It is also possible to use only dicarboxylic acids containing imide groups for the production of the resins.

In addition to dihydric alcohols, trihydric and/or higher alcohols can also be used as the polyhydric alcohols. The additional use of trihydric alcohols may be particularly desirable. One example of such an alcohol is glycerine. In one embodiment of the invention, a polyesterimide resin is used which has been produced with the additional use of tris-(2 hydroxyethyl)-isocyanurate (THEIC) as the trihydric alcohol. The THEIC can be present in the mixture of polyhydric alcohols in an amount of at least 20 equivalent %, preferably in an amount of at least 50 equivalent %. Resins of this kind containing a mixture of glycol and THEIC as the alcohol component are particularly useful.

In the case of the additional use of a tri- or higher polyhydric alcohol, it may be desirable to use a polyesterimide resin produced from a reaction mixture containing up to 3 equivalents of hydroxyl groups of the tri- or higher polyhydric alcohols to 2 equivalents of ester-forming carboxyl groups.

In the present invention, it may be desirable to use polyesterimide resins of the above-mentioned type which possess a cross-linking equivalent weight of between 400 and 1600. The cross-linking equivalent weight of electrically insulating resins which may be hardened through their free hydroxyl groups is the amount of resin in grammes which contains a cross-linkable (i.e. hardenable) free hydroxyl group. Cross-linking equivalent weights of 700–1400 are preferred.

The production of the polyesterimide resins for use in the invention is preferably carried out in the absence of undesired solvents. In a preferred way of proceeding, the reaction components which form imide groups and the components which are also required for polyesterimide formation are caused to react in the presence of an excess of one or more short-chain diols. By the removal of a part of the diol component, the resin is then condensed to such an extent that it complies with the required conditions as regards softening point and melt viscosity.

For use in the invention, resins are preferred in which ethylene glycol is used as the short-chain diol employed in excess. Other low-boiling point diols, preferably containing not more than 5 C-atoms, e.g. propylene glycol-1.2 and butylene glycol-1.3, can, however, be used.

The operating temperature used for coating the electrical conductor from the melt conveniently lies in the range of from 100° to 200° C., preferably in the range of 140° to 190° C. The subsequent burning-in is carried out in known manner at a higher temperature.

With the method of the invention polyesterimide resins having particularly low degrees of condensation can be used for coating from the melt. From the point of view of use, this is of great significance because of the low melting ranges of the resins used and because the latter exhibit a viscosity which is favourable from the processing viewpoint, i.e. is low even at relatively low temperatures.

Surprisingly, it has been found that this is of decisive importance from the point of view of melt-lacquering technique, that the low-condensation resins of this type remain stable at the processing temperatures, even over a long period of time. This is all the more noteworthy since the prior art does not recommend the use of low-condensation resins for the application of resins from the melt. The viscosity of the resin melts used in the present invention does not change substantially at 180° C., for example, for up to 100 hours. This special property of the resin melts used in the invention permits particularly simple application of the resins to the electrical conductors. It is unnecessary to use enclosed baths to prevent possible volatile components from escaping from the resin melt. In the method of the invention, open baths can be used satisfactorily. Generally, however, it will be desirable to provide at least a cover for the bath in order to guard against the undesired entry of dust and dirt. The essential point is, however, that no vapour-tight seal is required for the melt bath.

The reactivity of the resin melts used in the present invention is sufficiently high to ensure that within a short time after the coating, they can be burned-in on the conductor, even without the use of cross-linking catalysts such as are employed in conventional lacquers containing solvent, to form a fully hardened insulating layer having outstanding thermal, electrical and mechanical properties.

The outstanding surface quality of insulated wires produced by the method of the invention is particularly striking.

Preferably, in the present invention, the minimum application thickness of the lacquer which is required by Standard Committees, is achieved in two applications. It is also, however, basically possible to achieve the required layer thickness in one application. In practice, however, the double application is preferred since it offers a greater degree of safety, in particular in respect of the number of faults in the insulation.

The technical advance in comparison with the conventional process using lacquers containing solvent will be obvious.

A great advantage of the method of the invention over the previously known processes employing cresolic solvents resides in its environmental advantages.

Measurements carried out with a flame ionisation detector device on a vertical lacquering furnace of 3 m shaft length under varied coating conditions, but without additional cleansing of the waste gas, resulted in the establishment of a maximum of 20 mg carbon consisting of combustible organic substances per cubic meter of waste gas.

This value is one power of ten below the legal limit in Germany, for example, the 7th Order of the Anti-Pollution Law of the district of NordrheinWestfalen, which relates to the discharge limits from drying furnaces. This Order states that the waste gases should be cleansed in such a way that the carbon content in the undiluted waste gases does not exceed 300 mg per normal cubic meter of waste gas.

The invention is illustrated by the following examples:

EXAMPLE 1

Production of the polyesterimide resin

For the production of a polyesterimide resin having an equivalent ratio of hydroxyl groups to carboxyl groups in the starting mixture of 4.3:1, there was weighed in a 2 l ground-glass flask provided with a distillation column, 51.7 g of glycerine, 373.8 g of ethylene glycol, 150.2 g of terephthalic acid and 14.2 g of butyl titanate and, whilst stirring the mixture passing an inert gas through the flask, and distilling off water of condensation, the temperature is increased in such a way that the vapour temperature does not rise above 105° C. At a temperature of between 190° and 200° C., the mixture became clear; the mixture was then maintained at this temperature for a further ½ hour. The mixture was then cooled to 130° C., and subsequently 271.4 g of trimellitic anhydride and 138 g of diaminodiphenylmethane were added and the temperature was increased over 2 to 3 hours to 185° C. At this temperature, the mixture was agitated until the resin became clear. The temperature was then increased to 210° C. over 3 hours.

After the discontinuance of the heating and the addition of 0.7 g of zinc naphthenate, the flask was evacuated down to a pressure of 60 to 70 mbar. The excess ethylene glycol was distilled off until the viscosity of the resin was 500 mPa s at 160° C. The viscosity of the resin at 180° C. was 270 mPa s; after six days storage at this temperature the viscosity had only risen to 348 mPa s.

The Durrans softening point of the unhardened resin was 75° C.

Insulation of the electrical conductor:

The coating experiments which will be described below, were made on a 1 mm bare copper wire and were carried out using continuous movement of the wire with a 3 m vertical furnace at a furnace temperature of 550° C. and a draw-off speed of 4.5 to 8 m per minute.

The resin produced, as described above, was melted in a heated bath and fed to a heated application device. In its lower part, the application device included a wire guide and in its upper part two stripping nozzles whose bores determined the thickness of the applied coating.

In this experiment, the layer thickness of about 55μ provided for this bare wire diameter in accordance with German Industrial Standard DIN 46 435 for so-called single-lacquer wires, was achieved in two stages. The bores in the nozzles were 1.06 and 1.08 mm respectively.

The resin melt in the application system was maintained at a constant temperature of 170° C. for the entire duration of the experiment by means of a control device.

The characteristic values of the insulated wire produced by the method of the invention were within the following limits, depending upon the distance of travel:

| | |
|---|---|
| Surface hardness (pencil hardness in accordance with German Industrial Standard DIN 46 453): | 3 H |
| Peel test (in accordance with IEC 251-1): | 190 to 230° C. |
| Breaking test (snap test in accordance with Nema, MW 1000-1967): | satisfactory |
| Winding resistance (rolled about its own diameter): | ≧25% prestretch |
| Softening temperature (in accordance with German Industrial Standard DIN 46 453): | 265 to 280° C. |
| Heat shock (rolled about its own diameter): | 190 to 200° C. |
| Breakdown voltage (in accordance with German Industrial Standard DIN 46 453): | 3.5 to 5.0 kV |

EXAMPLE 2

Resin production

For the production of a polyesterimide resin with an equivalent ratio of hydroxyl to carboxyl groups in the starting mixture of 6.4:1, 69.620 kg of ethylene glycol, 0.125 kg of butyl titanate, 40.698 kf of trishydroxyethylisocyanurate, 16.944 kg of dimethyl terephthalate, 47.910 kg of trimellitic anhydride, and 24.740 kg of diaminodiphenylmethane were fed into an industrial reactor.

The mixture was slowly heated whilst it was stirred, inert gas was passed through, and methanol and water were distilled off.

After 8 hours, with an amount of distillate of 15 l, a temperature of 192° C. was reached; a resin sample was clear after cooling to room temperature.

A vacuum was then applied stepwise, and with a further increase in temperature to 200° C., ethylene glycol was distilled off until the viscosity of the resin was 900 mPa s at 160° C.

When this viscosity had been reached, the resin was pressed off at 180° C. through a glass-fibre filter into sheet metal barrels where it solidified to form a brittle solid resin.

The viscosity of the resin at 180° C. was 280 mPa s; after 6 days storage at this temperature, the viscosity had risen to 320 mPa s.

The Durrans softening point of the unhardened resin was 83° C.

Insulation of the electrical conductor:

This was carried out as in Example 1. The draw-off speed in this case was between 4.5 and 9 m per minute, and the temperature of the resin melt was 180° C.

Characteristic values of the insulated wire

| | |
|---|---|
| Surface hardness (pencil hardness in accordance with DIN 46 453): | 3 H |
| Peel test in accordance with IEC 251-1: | 175 to 200° C. |
| Breaking test (snap test in accordance with Nema NW 1000-1967): | satisfactory |
| Winding resistance (rolled about its own diameter): | 10 to 15% pre-stretch |

-continued

| | |
|---|---|
| Softening temperature (in accordance with DIN 46 453): | 340 to 360° C. |
| Heat shock (rolled about its own diameter): | 195 to 205° C. |
| Breakdown voltage (in accordance with DIN 46 453): | 3.5 to 5.0 kV |

EXAMPLE 3

Resin production

For the production of a polyesterimide resin with an equivalent ratio of hydroxyl groups to carboxyl groups in the starting mixture of 3.5:1, 52.018 kg of ethylene glycol. 0.146 kg of butyl titanate, 41.402 kg of trishydroxyethylisocyanurate, 35.478 kg of dimethylterephthalate, 46.818 kg of trimellitic anhydride, and 24.138 kg of diaminodiphenylmethane were fed into an industrial reactor.

The mixture was slowly heated whilst being stirred, inert gas being passed in and methanol and water distilled off. After 8½ hours, with a distillate quantity of 19 l, a temperature of 187° C. was reached; a resin specimen was clear after cooling to room temperature.

Vacuum was then applied stepwise and by effecting a further temperature increase to 200° C., ethylene glycol was distilled off until the viscosity of the resin was 500 mPa s at 160° C.

When this viscosity was reached, the resin was released by pressure at 180° C. through a glass-fibre filter into sheet metal barrels in which it solidified to form a brittle solid resin.

The viscosity of the resin at 180° C. was 210 mPa s; after 4 days storage at this temperature, the viscosity had risen to 435 mPa s.

The Durrans softening point of the unhardened resin was 79° C.

Insulation of the electrical conductor

This was carried out as in Example 1. The draw-off speed in this case was between 5 and 9 m per minute, and the temperature of the resin melt was 180° C.

Characteristic values of the insulated wire

| | |
|---|---|
| Surface hardness (in accordance with DIN 46 453 - pencil hardness): | 3 to 4 H |
| Peel test (in accordance with IEC 251-1): | 165 to 195° C. |
| Breakage test (snap test in accordance with Nema MW 1000-1967): | satisfactory |
| Winding resistance (rolled about its own diameter): | 10 to 15: pre-stretch |
| Softening temperature (in accordance with DIN 46 453): | 360 to 380° C. |
| Heat shock (rolled about its own diameter): | 200 to 210° C. |
| Breakdown voltage (in accordance with DIN 46 453): | 3.5 to 5.0 kV. |

What we claim as our invention and desire to secure by Letters Patent of the United States is:

1. A polyester amide resin produced by condensing a polybasic acid with polyhydric alcohol, one of which contains one or more five-membered imide rings between functional groups of the molecule which resin is the product of condensing said polybasic acid and said polyhydric alcohol in the presence of an excess of one or more shortchain diols followed by removal of the diol or diols in such a manner that the condensation is only effected to an extent such that the Durrans softening point of the unhardened resin is not greater than 150° C. and the viscosity of the molten resin at 180° C. is not greater than 5000 mPa s (cP).

2. A resin according to claim 1, wherein the diol excess is 1.25 to 3 mols of diol per mol of ester group of the resin.

3. A resin according to claim 1, wherein the equivalent ratio of hydroxyl groups to ester-forming carboxyl groups in the reaction mixture used to form said resin is in the range of 2.5–20:1.

4. A resin according to claim 1, wherein the equivalent ratio of dhyroxyl groups to ester-forming carboxyl groups in the reaction mixture used to form said resin is in the range of 3–8:1.

5. A resin according to claim 1, which has a Durran softening point of not greater than 100° C.

6. A resin according to claim 5, wherein said resin has a viscosity of not more than 1000 mPa s (cP) at 180° C.

7. A resin according to claim 1, wherein said resin has a cross-linking equivalent weight of 400–1600.

8. A resin according to claim 7, wherein said resin has a cross-linking equivalent weight of 700–1400.

9. A resin according to claim 1, wherein said resin has a Durran softening point in the range of 60°–150° C.

10. A resin according to claim 9, wherein said resin has a Durran softening point in the range of 65°–90° C.

11. A resin according to claim 1, produced from one or more dicarboxylic acids containing amide groups which acids have themselves been produced by the reaction of at least two mols of trimellitic acid or trimellitic anhydride with one mol of an aromatic diamine.

12. A resin according to claim 11, wherein the aromatic diamine employed for the production of said dicarboxylic acid is a dinuclear diprimary aromatic diamine.

13. A resin according to claim 11, wherein said dicarboxylic acid is one prepared from terephthalic acid or isophthalic acid.

14. A resin according to claim 11, wherein said polyhydric alcohol is a dihydric alcohol or trihydric alcohol.

15. A resin according to claim 14, produced in the presence of tris-(2-hydroxy ethyl) isocyanurate.

16. A resin according to claim 15, wherein said tris-(2-hydroxy ethyl) isocyanurate is present in a resin-forming mixture in an amount of at least 20 equivalent percents based upon the amount of polyhydric alcohol present therein.

* * * * *